Nov. 29, 1960 S. A. SCHERBATSKOY 2,962,590
RADIATION DETECTING
Filed Jan. 24, 1955 2 Sheets-Sheet 1

INVENTOR.
Serge A. Scherbatskoy

2,962,590

RADIATION DETECTING

Serge A. Scherbatskoy, 804 Wright Bldg., Tulsa 3, Okla.

Filed Jan. 24, 1955, Ser. No. 483,572

4 Claims. (Cl. 250—71.5)

My invention relates to measuring devices and methods and particularly to methods and apparatus for detecting and measuring nuclear radiations.

It is an object of my invention to measure selectively the direct radiations emitted by a distant source and to attenuate other radiation emitted by said source and scattered by the surrounding medium.

It is another object of my invention to improve the directional response of a radiation detector.

It is another object of my invention to improve the resolution in radiation measurements of radiation scanning devices and methods.

It is another object of my invention to improve the resolution in non-destructive testing of various objects and substances.

Other objects of my invention will be made apparent in connection with the following description and the drawings in which.

Figure 1:
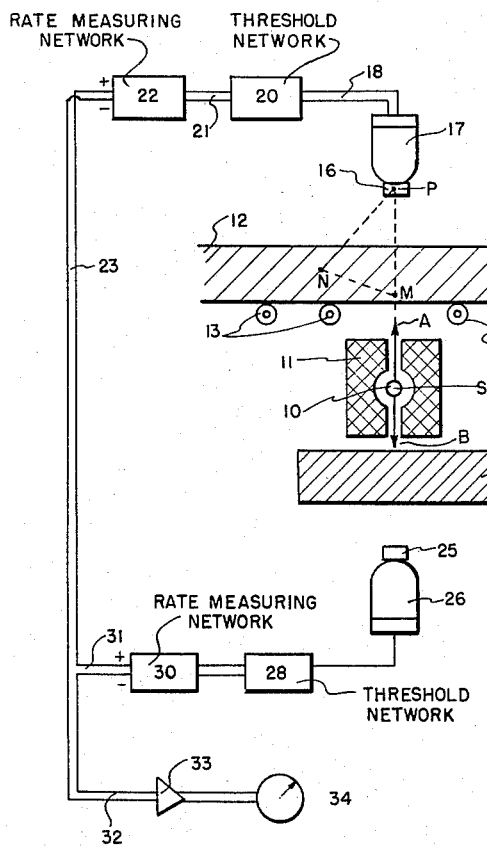
Fig. 1 shows a schematic arrangement of the equipment for detecting structural defects or variation in thickness of cold or hot strip as it is produced in a steel mill.

Referring now more particularly to Fig. 1, numeral 10 designates a radiation source, such as $Co^{60}$, emitting gamma ray photons having energies of about 1.2 mev. More particularly, the emitted photons have two energy values 1.17 mev. and 1.33 mev., but for illustrative purposes we shall designate the energy as 1.2 mev. This source is placed in a block 11 of a material such as lead or tungsten which will strongly absorb all emitted rays except those passing through narrow holes in the direction of the arrows A and B. The collimated beam of gamma rays emitted in the direction of the arrow A penetrates an elongated metal strip 12 which it is desired to test as it glides on the rolls 13 in a steel mill. The collimated beam of gamma rays emitted in the direction of the arrow B penetrates a standard strip 14 of desired thickness and structural characteristics which is to be compared with the moving strip 12.

Consider now the collimated beam of photons transmitted upwards towards the strip 12. As this beam traverses the strip photons are gradually scattered from the original beam, and therefore the number of photons that remains in the beam gradually decreases. Let $I_0$ designate the intensity of the beam incident on the strip 12, $I_1$ the intensity of the beam that remained unscattered after traversing a thickness $d$ of the metal strip and let $\mu$ designate the absorption and scattering coefficient of the beam. We have therefore $$I_1 = I_0 I^{-\mu d} \tag{1}$$

Since the intensity $I_0$ and thickness $d$ are known, the measurement of $I_1$ would indicate the absorption and scattering coefficient $\mu$. As is well known, the value $\mu$ varies with the degree of homogeneity of the traversed substance and therefore by measuring $I_1$ we can determine various anomalies in the material being tested. Since the incident beam $I_0$ is substantially monochromatic, i.e. each emitted photon has the energy 1.2 mev., the unscattered beam $I_1$ that has traversed the thickness $d$ is also monochromatic and of the same energy 1.2 mev. It is apparent, however, that in addition to the directly transmitted radiations some radiations are scattered and during the process of scattering they undergo energy degradation. Let 16 designate a scintillation crystal adapted to detect gamma rays as influenced by the strip 12. The crystal 16 may be of anthracene, sodium iodide, or cadmium tungstate or of any other substance adapted to produce a light flash as a result of interaction with the incident photon. The crystal 16 is sufficiently large so as to absorb completely the incident photon, said absorption taking place in one, two, or more collisions within the crystal, and consequently the total light emitted and incident on the photomultiplier 17 is substantially proportional to the energy of the absorbed photon. Thus we obtain in the output leads 18 of the photomultiplier a succession of voltage impulses having magnitudes representing the corresponding energies of the incident photons.

The crystal 16 is intercepted not only by the directly transmitted beam $I_0$ comprising photons of energies 1.2 mev. but also by scattered radiation having energies below 1.2 mev. Thus for instance, a photon arriving along the direction SM may be scattered at the point M in the direction N and subsequently it may be scattered at the point N in the direction NP and become intercepted by the crystal. These scattered radiations are very undesirable since they may mask the radiation directly transmitted and therefore the measurement of the total radiations intercepted by the crystal 16 would be of little value.

Since, however, the directly transmitted photons have energies of 1.2 mev. and scattered photons are degraded to energies below 1.2 mev., it is possible to eliminate the scattered radiation by means of an energy discriminating filter. At stated above, one obtains in the output of the photomultiplier 17 a succession of impulses having magnitudes proportional to the energies of intercepted photons. I provide in the output of the photomultiplier a threshold network 20 characterized by a threshold that corresponds to photon energies of 1.1 mev. The network is adapted to transmit to the output leads 21 only the impulses corresponding to energies above 1.1 mev. that are due mainly to the direct rays and to eliminate the impulses corresponding to energies below 1.1 mev. that are due mainly to the degraded scattered photons.

It is thus apparent that the number of impulses per second in the output of the threshold network 20 represents predominantly those photons that have been transmitted directly through the strip 12 and represents therefore the value $I_1$ in the Equation 1. The output leads 21 of the network 20 are applied to a rate measuring network 22 adapted to produce across its output leads 23 a D.C. voltage representing the rate of occurrence of the impulses applied across its input leads 21. Consequently the output voltage of the network 22 represents the value $I_1$.

The radiations emitted by the source 10 are also directed along the arrow B and interact with a standard strip 14 of a desired structural homogeneity. The intensity of the beam incident upon the strip 14 is also equal to $I_0$. The resulting radiations that are transmitted and scattered by the strip 14 interact with the crystal 25 cooperating with the photomultiplier 26. The crystal 25 and photomultiplier 26 are identical respectively to the crystal 16 and photomultiplier 17. The output of the photomultiplier 26 is applied to a threshold network 28 and subsequently to the rate measuring network 30. The networks 28 and 30 are respectively identical to the networks 20 and 22. It is apparent that the crystal 25 is intercepted by the radiations that are transmitted through the strip 14 and also scattered by the strip 14. In the same manner as hereinabove, we eliminate the scattered degraded photons by means of the threshold network 28 and we thus obtain across the output terminals 31 of the network 30 a D.C. voltage having magnitude representing the radiation beam transmitted through the standard strip 14.

The outputs of the networks 22 and 30 are mounted in opposition so as to produce across the leads 32 a voltage representing the difference between the intensity of the radiation beam transmitted through the unknown strip 12 and the intensity transmitted through the standard strip 14. This voltage is amplified in the amplifier 33 and indicated on the meter 34. Consequently, whenever the meter 34 indicates zero, the transmission characteristics of the unknown strip 12 and of the standard strip 14 are equal and, therefore, the structure of the unknown strip 14 is assumed to correspond to the structure of the standard strip. On the other hand, whenever the indication of the meter 34 deviates from zero it is assumed that a structural anomaly is present in the strip 12.

Another application of my invention deals with directional radiation detectors. A directional radiation detector is responsive not only to the intensity of the incident radiation but also to its direction. Usually a directional radiation detector gives a maximum response when its axis is aligned along the direction of the incoming radiations and its response decreases with increase in the deviation of said axis from said direction.

Figure 2:
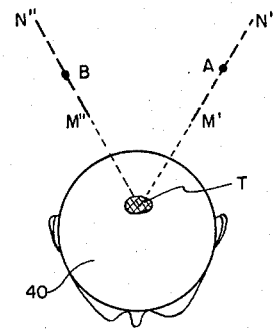
Fig. 2 shows diagrammatically a method of locating a tumor in the brain.

A directional radiation detector has important application for diagnostic purposes in medicine. It has recently been proposed to locate brain tumors by injection into the blood stream of a patient a radioactive substance such as $I^{131}$-enriched diiodofluorescein. This substance is selectively absorbed by diseased tissue and therefore after the injection the tumor becomes a source of radiation. The problem of locating the tumor is therefore analogous to the location of a radiation source and can be solved by applying the principles of this invention. In Fig. 2 numeral 40 indicates a human head and T the position of a tumor. The directional detector is placed initially at the location A and rotated until its axis becomes aligned along the direction M"N'. Subsequently we place the detector at the location B and rotate its axis until it becomes aligned along the direction M"N". It is apparent that the intersection of the line M'N' with the line M"N" provides the position of the tumor T.

Figure 3:
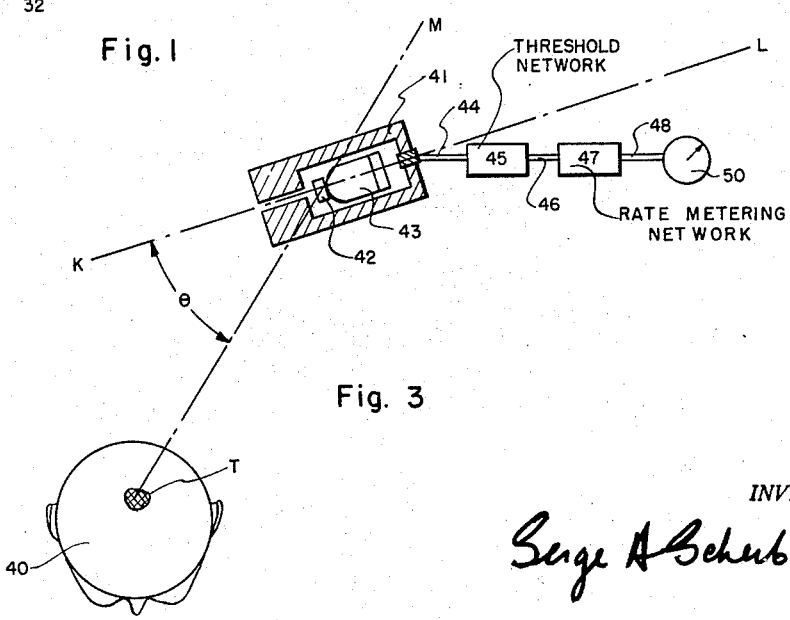
Fig. 3 illustrates the operation of a directional receiver embodying the principles of the present invention.

Consider now Fig. 3 showing the human head 40, tumor T and a directional detector having its axis KL inclined with respect to the direction of the tumor T (designated as MT) at any angle $\theta$.

It is assumed that the tumor T has selectively absorbed the injected tracer ($I^{131}$) and therefore became a source of monochromic gamma rays having the energy .37 mev. Some of these rays are transmitted radially from the source T and retain their original energy of .37 mev.— these are the direct radiations that have not interacted with the surrounding brain tissue. Other radiations emitted by the source T undergo one or more scattering collisions in the surrounding tissue. As a result of these collisions their energy is degraded and they emerge from the head 40 in various directions.

The directional receiver consists essentially of a crystal 42 in conjunction with the photomultiplier 43 and a lead shield 44. The crystal may be of anthracene, sodium iodide, or of any other substance adapted to produce light as a result of interaction with photons. The shield 44 is of a material such as lead or tungsten that will strongly absorb all incident photons except those arriving along the direction KL designated as the axis of the directional receiver. Thus the radiations arriving along the direction of the axis are intercepted by the crystal 42 and radiations arriving along other directions are attenuated by the shield 42 and therefore do not interact with the crystal 42. The crystal is sufficiently large so as to absorb substantially all the energy of the incoming photons and thus we obtain across the output leads 44 of the photomultiplier 43 a succession of impulses, said impulses having magnitudes representing the energies of the corresponding photons that interacted with the crystal 42.

As shown in Fig. 3 the axis KL of the detector 41 is inclined with respect to the direction of the source T at an angle $\theta$. Assume now that the detector is maintained at the same position but its axis is rotated in the plane of the figure. The deviations in one direction with respect to the direction of the source T corresponding to positive values of $\theta$ and the deviations in the opposite direction corresponding to negative values of $\theta$.

Figure 4:
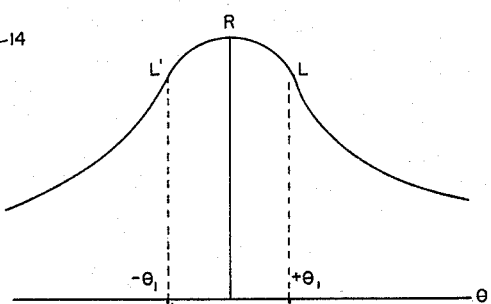
Fig. 4 illustrates the directional characteristics of a receiver used in the prior art.

If the axis of the detector is aligned along the direction of the source T the detector receives almost entirely the unscattered photons, i.e. the direct radiations from the source. If, however, the axis of the detector deviates by a small angle either in the positive or negative direction from the original alignment, then the radiation received by the detector consists almost entirely of the radiations that are scattered by the brain tissue. This situation is illustrated in Fig. 4 in which the abscissas designate the angle of deviation $\theta$ and the ordinates designate the radiation intensities intercepted by the detector for various values of $\theta$. The ordinate R for the alignment of the detector axis along the direction of the source ($\theta=0$) corresponds to the maximum of the received radiation. As mentioned above in this case, the received radiation consists almost entirely of the photons having energies .37 mev. that were directly emitted by the source T. For any other direction such as for $\theta=\theta_1$, the radiation arriving at the detector contains almost entirely the photons that were originally emitted by the source T in various directions, but became subsequently scattered by the surrounding brain tissue. During the scattering these photons underwent degradation of energy and consequently the scattered photons have energies below .37 mev. Furthermore, the intensities of the scattered radiation as indicated by the ordinates FL and F'L' (corresponding to $+\theta_1$ and $-\theta_1$, respectively) are smaller than the intensity of the direct radiation indicated by the ordinate OR and corresponding $\theta=0$.

Consequently by rotating the axis of the directional detector but maintaining its position in space and thus scanning various angles $\theta$, we may observe that for a particular orientation of the detector the intensity of the radiation intercepted is maximum. We may then identify this particular orientation as the direction of the radiation source. It is apparent, however, by referring to Fig. 4 that the maximum of the ordinate in the diagram is rather flat and therefore the unknown direction cannot be determined with great precision since the incoming radiation flux does not vary much if the orientation of the detector is within the range $-\theta_1 < \theta < \theta_1$.

The object of my invention is to improve the directional resolution of the detector by making it responsive only to the direct radiation and not responsive to the scattered radiation.

Referring now again to Fig. 3, the output of the photomultiplier 43 is applied to a threshold network 45, this network being adapted to transmit to leads 46 only impulses that exceed a certain threshold value and to attenuate impulses below this threshold value, the threshold value corresponding to impulses that are produced by photons having the energy 0.35 m.e.v. We may consider the photons having energies above 0.35 mev. as representing the direct radiation and the photons having energies below 0.35 mev. as representing the scattered degraded radiation. Consequently the number of impulses per second in the output of the network 45 represents the intensity of direct radiation intercepted by the crystal 42. The threshold network 45 is connected to a rate metering network 47 which is adapted to produce across its output terminals 48 a D.C. voltage representing the rate of occurrence of the impulses applied to its input terminals. The output of the network 47 is indicated on the meter 50. Consequently the indication of the meter 50 represents the intensity of direct radiation emitted by the source T that intercepts the crystal 42. It is thus apparent that the directional detector is responsive to direct radiations only and irresponsive to scattered radiations.

Figure 5:
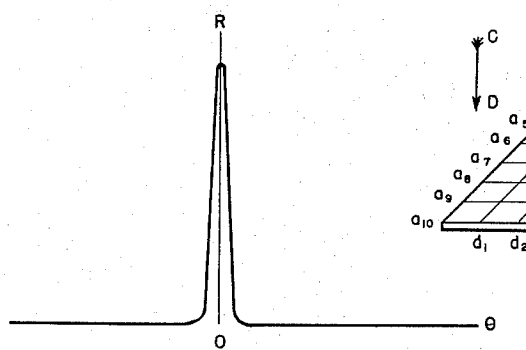
Fig. 5 illustrates the directional characteristics of a receiver embodying the principles of the present invention.

Consider Fig. 5 in which the abscissas represent the angular deviation $\theta$ of the axis of the detector 41 with respect to the direction of the source T, and the ordinates represent the corresponding indications on the meter 50. Only direct radiations cause a response of the meter 50, and for $\theta=0$ the indication OR is produced. For all other values of $\theta$ there is no direct radiation and consequently the indication of the meter 50 will be zero. Consequently the output of the meter varies with $\theta$ as shown in Fig. 5, i.e. the variation being characterized by a very sharp and very narrow peak at $\theta=0$. It is apparent that the resolution of the detector characterized by the response shown in Fig. 5 is considerably better than that of the detector having a response as shown in Fig. 4. Since the maximum in Fig. 5 is very sharp, it is relatively easy to align the detector in a direction corresponding to the maximum output and such an alignment will correspond to a very well defined orientation.

It is thus apparent that by making the detector insensitive to the scattered gamma rays and selectively responsive only to the direct radiation, I have improved considerably its resolution and its directional response.

Figure 7:
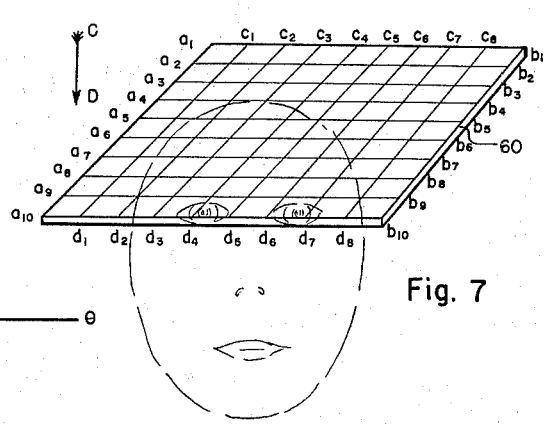
Fig. 7 shows in perspective the arrangement of Fig. 6.
Figure 6:
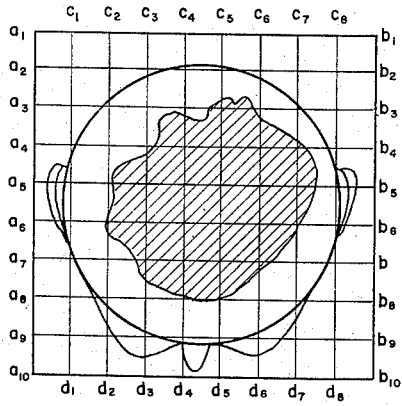
Fig. 6 illustrates a plane view of an arrangement for plotting the distribution of radioactivity in the brain.

Consider now a different situation in which the tumor is not localized in a relatively small volume at the point T as shown in Fig. 2, but is spread over a larger portion of the brain as shown in the horizontal cross section of Fig. 6. After the injection of the enriched diiodofluorescein the radioactive iodine will be spread over a portion of the brain tissue and the concentration of the radioactivity will not be uniform but will vary with the concentration of diseased tissue. The problem here is therefore different since it is of interest to plot a diagram representing the relative concentration of radioactivity at various points in the tissue. This can be accomplished by scanning with the directional detector along a definite pattern as shown in Fig. 6 and Fig. 7. The detector is of the type shown in Fig. 3, i.e. it has a directional axis KL along which a beam of gamma rays is made to interact with the crystal 42, and is provided with a gate network 45, so that the indicator 50 shows the intensity of only those gamma rays that have not undergone the scattering process. It should be noted that during the scanning the axis KL of the detector is perpendicular to the plane in which the scanning is performed. Thus in Fig. 6 the axis KL is perpendicular to the plane of the figure and in Fig. 7 the axis KL is parallel to the arrow CD.

Figure 8:
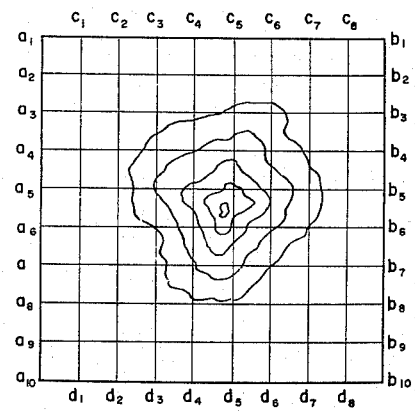
Fig. 8 shows a plot of the distribution of radioactivity in the brain.

The scanning is effected on the flat surface of a mold 60 placed on the head of the patient as shown in Fig. 7. The directional detector is moved successively along the scanning lines $a_1-b_1$; $a_2-b_2$; $a_3-b_3$ ... $a_{10}-b_{10}$ and the radiation measurements are performed at points along these lines at which they intersect the perpendicular lines $c_1-d_1$; $c_2-d_2$; ... $c_8-d_8$. During the scanning process the detector may be held by hand or moved mechanically and placed in succession in the positions on the surface of the mold. It is apparent that the measurement at each point as indicated on the meter 50 represents the intensity of the unscattered radiations received at that point and represents in turn the intensity of radioactive tracer concentrated at the point of emission. A record is then made of the indication of the meter 50 corresponding to each position of the directional detector. The indications are then plotted on a sheet of paper so that each measurement point is represented by a dot and a numeral that indicates the counting rate. Subsequently, dots having the same counting rates are interconnected, thus producing a diagram of lines of equal counting rates as shown in Fig. 8. It is apparent that a diagram as shown in Fig. 8 gives a visual image of the distribution of the radioactive tracer in the brain.

Figure 9:
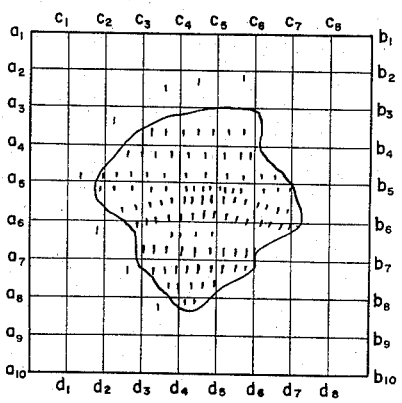
Fig. 9 shows another plot of the distribution of the radioactivity in the brain.

Another method for indicating the distribution of the radioactive tracer is shown in Fig. 9 representing diagrammatically the scanning surface on which are indicated the scanning lines $a_1-b_1$, $a_2-b_2$, etc and the corresponding lines along the intersection of which the radiation measurements are made. These measurements are represented by dots as shown in Fig. 9, the density of the dots at any particular location on Fig. 9 being an index of the intensity of the radiation measured at each location by means of the detector shown in Fig. 3. Thus the density of the dots provides a visual representation of the density of the distribution of the injected radioactive tracer in the brain tissue.

It is of importance to note that the scanning system as shown in Fig. 6 is not necessarily limited to plotting the distribution of a radioactive substance in brain tissue but can be used to determine such distribution in any other medium such as for instance in the soil, or in the atmosphere. An essential element for the scanning process is a directional gamma ray detector that indicates the direcincident gamma rays arriving along a determined direction. The detector should have very sharp directional selectivity, i.e. it should not be responsive to indirect scattered gamma rays coming from any other direction. The scanning can be effected in two ways: by transportation of the detector or by angular orientation. The scanning by transportation is illustrated in Figs. 6, 7, 8, and 9. The detector is moved in accordance with a pattern and while its point of reception varies, its directivity is maintained constant. In the angular orientation type scanning the point of reception remains the same, but the direction of the reception varies so as to cover successively the directions of all the incident gamma rays that arrive at the point of reception from surrounding space. In the angular orientation type scanning, the directional detector rotates about a fixed point and the orientation of its axis varies. In the transportation type scanning the directional detector moves from one point to another, while its orientation remains the same.

It is essential that in both scanning systems the receiver should produce in its output current impulses have magnitudes substantially proportional to the energy of the incident photons. This can be accomplished for instance by the use of a scintillation counter sufficiently large so as to absorb substantially all incident photons, thus in the output of the photomultiplier current impulses are obtained that are proportional to the energy of the photons. Another essential feature of my scanning system resides in the use of a pulse discriminating network connected to the output of the directional detector.

The pulse discriminating network may be of the gate type in which case it transmits only pulses corresponding to gamma rays having energies comprised within a definite and relatively narrow energy range. Or, the pulse discriminating network may be of the threshold type and transmit only those pulses that correspond to incident gamma rays having energies above a determined threshold value.

Two types of measurement are performed: One, the scanning measurement involving determination of the position or axis angle of the detector, and two, the determination of the intensity of the received direct radiation. It is apparent that there is a unique correspondence between the two measurements and the results may be represented in form of a tabulation of a succession of pairs of values. Instead of tabulating the values, they represented them graphically.

I claim:

1. In apparatus for determining the transmission characteristics of an unknown material sample, the combination comprising a source means for radiating a penetrative beam of substantially monoenergetic photons having an energy value in the gamma-ray portion of the spectrum, means disposing said sample in the path of said beam, detector means disposed relative to said source and said sample for intercepting photons in said beam after they have passed through said sample and been partially scattered therein, said detector means being operative to produce electric pulses having magnitudes related to the energies of photons detected thereby, and magnitude-discriminating means fed by said detector means for separating pulses having magnitudes corresponding to the incident photons in said beam and rejecting pulses of lower energy levels corresponding to photons scattered in said material sample.

2. In apparatus for determining the characteristics of an unknown material, the combination comprising a source means for radiating into said material a beam of gamma rays of known energy characteristics, detector means disposed to intercept rays in said beam after they have passed through said material and been partially scattered therein, said detector means being operative to produce electric pulses having magnitudes related to the energies of rays detected thereby, and magnitude-discriminating means fed by said detector means for selectively receiving pulses having magnitudes corresponding to the energies of the incident rays in said beam and rejecting pulses corresponding to rays of lower energy levels.

3. In apparatus for determining the characteristics of an unknown material, the combination comprising a gamma-ray source for radiating into said material a beam of substantially monoenergetic rays, detector means disposed to receive said rays after they have emerged from said material, said detector means being operative to produce electric pulses having magnitudes substantially proportional to the energies of detected rays, magnitude-discriminating means fed by said detector for selectively receiving pulses corresponding to rays having energies above a predetermined value and rejecting pulses corresponding to rays of lower energy levels, and means coupled to said magnitude-discriminating means for measuring the average recurrence rate of the pulses selected by said magnitude-discriminating means.

4. In apparatus for determining the transmission characteristics of an unknown material, the combination comprising a gamma-ray source for radiating into said material a beam of substantially monoenergetic gamma rays, detector means disposed to intercept rays from said beam after they have emerged from said material, said detector means being operative to produce electric pulses having magnitudes related to the energies of rays detected thereby, and magnitude-discriminating means fed by said detector means for selecting pulses having magnitudes corresponding to detected gamma rays of energies above a predetermined level and rejecting pulses corresponding to detected gamma rays of lower energy levels.

References Cited in the file of this patent

UNITED STATES PATENTS

| | | |
|---|---|---|
| 2,642,537 | Carroll et al. | June 16, 1953 |
| 2,653,247 | Lundahl | Sept. 22, 1953 |
| 2,675,482 | Brunton | Apr. 13, 1954 |
| 2,675,483 | Leighton et al. | Apr. 13, 1954 |
| 2,711,480 | Friedman | June 21, 1955 |
| 2,750,513 | Robinson et al. | June 12, 1956 |
| 2,769,096 | Frey | Oct. 30, 1956 |
| 2,776,377 | Anger | Jan. 1, 1957 |